(12) United States Patent
Ejiri et al.

(10) Patent No.: US 11,971,973 B2
(45) Date of Patent: Apr. 30, 2024

(54) UILIZATION CONTROL SYSTEM, USE PERMIT ISSUANCE DEVICE, UILIZATION CONTROL METHOD, AND COMPUTER-READABLE PROGRAM

(71) Applicant: BITKEY INC., Tokyo (JP)

(72) Inventors: Yuki Ejiri, Tokyo (JP); Hiroshi Yamamoto, Tokyo (JP)

(73) Assignee: BITKEY INC., Tokyo (JP)

( * ) Notice: Subject to any disclaimer, the term of this patent is extended or adjusted under 35 U.S.C. 154(b) by 58 days.

(21) Appl. No.: 17/621,181

(22) PCT Filed: Jan. 20, 2020

(86) PCT No.: PCT/JP2020/001789
§ 371 (c)(1),
(2) Date: Dec. 20, 2021

(87) PCT Pub. No.: WO2020/261622
PCT Pub. Date: Dec. 30, 2020

(65) Prior Publication Data
US 2022/0366029 A1 Nov. 17, 2022

(30) Foreign Application Priority Data
Jun. 25, 2019 (JP) .................. 2019-117925

(51) Int. Cl.
*G06F 21/00* (2013.01)
*G06F 21/33* (2013.01)
*G06F 21/60* (2013.01)
*G06F 21/64* (2013.01)

(52) U.S. Cl.
CPC ............ *G06F 21/33* (2013.01); *G06F 21/604* (2013.01); *G06F 21/64* (2013.01)

(58) Field of Classification Search
CPC ........ G06F 21/33; G06F 21/604; G06F 21/64; G06F 21/32; G06F 21/35; G09C 1/00; H04L 9/14; H04L 9/32
See application file for complete search history.

(56) References Cited

U.S. PATENT DOCUMENTS

| | | | |
|---|---|---|---|
| 2007/0169182 A1* | 7/2007 | Wolfond | G06F 21/31 726/7 |
| 2013/0247142 A1* | 9/2013 | Nishizawa | H04L 63/0815 726/1 |
| 2015/0059003 A1* | 2/2015 | Bouse | G06F 21/31 726/28 |

FOREIGN PATENT DOCUMENTS

| | | |
|---|---|---|
| AU | 2004254771 B2 | 1/2005 |
| JP | 10-313307 | 11/1998 |

(Continued)

OTHER PUBLICATIONS

International Search Report for PCT/JP2020/001789, dated Mar. 10, 2020, 5 pages.

(Continued)

*Primary Examiner* — Ghazal B Shehni
(74) *Attorney, Agent, or Firm* — Nixon & Vanderhye P.C.

(57) ABSTRACT

The present invention reduces security risks while improving the convenience of utilization control technology of an usage target object. A use permit issuance device (1): stores, for each user, authentication data and an authentication method in association with identification information of one or more users and upon receipt of a use permit issuance request from a setting terminal (5), issues a use permit to generate a signature, and identifies the authentication data associated with the user identification information and the authentication method included in the issuance request, and notifies the setting terminal (5) of setting information including the use permit, the signature and the authentication data.

(Continued)

The setting terminal (5) registers the setting information in a use permit notification device (4). The use permit notification device (4) acquires authentication data from a user, and transmits the use permit and the signature of the setting information including the authentication data to a utilization control device (3). The utilization control device (3) verifies the signature, and if the signature verification is established, unlocks use restrictions of a usage target object when a use condition included in the use permit being satisfied.

9 Claims, 14 Drawing Sheets

(56) References Cited

FOREIGN PATENT DOCUMENTS

| | | |
|---|---|---|
| JP | 2003-132435 | 5/2003 |
| JP | 2004-295197 | 10/2004 |
| JP | 2004-348308 A | 12/2004 |
| JP | 2006-233475 | 9/2006 |
| JP | 2015-64722 | 4/2015 |

OTHER PUBLICATIONS

Written Opinion of the ISA for PCT/JP2020/001789, dated Mar. 10, 2020, 3 pages.
Office Action dated Jun. 27, 2023 issued in Japanese Application No. 2020-124800 with machine translation (15 pages).

* cited by examiner

Fig.5

Identification information table 1030

| Root ID: 001 | |
|---|---|
| Type/Intended-use | Identification information |
| Mail address | abcd@efg.co.jp |
| Mobile phone number | 090(1234)4567 |
| Employee number | A1015 |
| ⋮ | ⋮ |

Fig.6

Authentication data table 1031

| Root ID: 001 | |
|---|---|
| Authentication method | Authentication data |
| Face authentication | ************************ |
| Vein authentication | ************************ |
| Password authentication | ****** |
| ⋮ | ⋮ |

Fig.7

Key information storage part 104

| Object ID | Secret key | Public key | Common key |
|---|---|---|---|
| 2-1 | ******** | ******** | ******** |
| 2-2 | ******** | ******** | ******** |
| ⋮ | ⋮ | ⋮ | ⋮ |
| 2-n | ******** | ******** | ******** |

Fig.12

Setting information storage part 43

| Authentication data | Use permit | Signature |
|---|---|---|
| ******* | ***************************** | ************ |
| ******* | ***************************** | ************ |
| ⋮ | ⋮ | ⋮ |

Account information table 1033

| Type/Intended use | Identification information | Authentication method | Authentication data |
|---|---|---|---|
| | | Root ID: 001 | |
| Mail address | abcd@efg.co.jp | Face authentication | ******************************** |
| Mobile phone number | 090(1234)4567 | Vein authentication | ******************************** |
| Employee number | A1015 | Password authentication | ****** |
| .... | .... | .... | .... |

UILIZATION CONTROL SYSTEM, USE PERMIT ISSUANCE DEVICE, UILIZATION CONTROL METHOD, AND COMPUTER-READABLE PROGRAM

This application is the U.S. national phase of International Application No. PCT/JP2020/001789 filed 20 Jan. 2020, which designated the U.S. and claims priority to JP Patent Application No. 2019-117925 filed 25 Jun. 2019, the entire contents of each of which are hereby incorporated by reference.

TECHNICAL FIELD

The present invention relates to a utilization control technique for controlling use of a usage target object whose use can be restricted by locking/unlocking, by access control, or by encrypting/decrypting. As such an usage target object, it is possible to mention for example real estate such as a hotel, an inn, a guesthouse, a house, a warehouse, or a room, or a moving body such as an automobile or a bicycle, or a browsing terminal for an electronic medium containing for example an electronic medical record or an electronic book.

BACKGROUND ART

The Patent Literature 1 discloses a system in which, by only carrying a room key, one can use various services, including locking and unlocking of a room, and cashless drinking, eating and buying in a facility such as a corporate facility, a hospital, a game hall, a public facility, or the like.

This system comprises: a room key having a Radio Frequency Identification (RFID) tag that can store authentication data such as a room number, a password, customer information, or the like and that is readable and writable; RFID readers that are installed at various places of the facility for reading and writing information from and into the RFID tag of the room key; a database that stores information on rooms and equipment in the facility; and a server that is connected to the RFID readers and the database via a network and performs management of the rooms and the equipment in the facility. When one RFID reader reads the authentication data stored in the RFID tag of the room key to send the authentication data to the server and then the server authenticates the user by using the authentication data received from the RFID reader, the service associated with the RFID reader is provided to the user who has the room key.

CITATION LIST

Patent Literature

Patent Literature 1: Japanese Unexamined Patent Application Laid-Open No. 2003-132435

SUMMARY OF INVENTION

Technical Problem

The system described in the Patent Literature 1, however, premises that common authentication data stored in the RFID wireless tag of the room key is used for any service provided at a place where an RFID reader is installed in the facility, and does not suppose a situation where an existing of services employing different authentication methods are provided in the system.

Further, the system of the Patent Literature 1 premises that one service provider provides a plurality of services, and does not suppose a case where a plurality of service providers are involved in the system. For example, in the case where each service is provided by a different service provider, it is burdensome that a user must register his face authentication data again when he first uses a service of a service provider A who requires face authentication data although the user already has registered his face authentication data for using a service of a service provider B.

Further, the system of the Patent Literature 1 does not suppose a case where the facility is used by a group of users. In such a case, a group of users who use the facility determines a representative and the representative is entrusted with management of the room key and locking and unlocking of the facility. Consequently, the burden on the representative is great. On the other hand, the other users than the representative cannot freely lock or unlock the facility by themselves. This is inconvenient.

Further, the system of the Patent Literature 1 premises that a room key is lent out and returned at a reception desk of a corporate facility, a hospital, a game hall, a public facility, or the like. In other words, for using a facility, a user must receive a room key at the reception desk and return the room key at the reception desk after using the facility. Accordingly, this is inconvenient if the facility is geographically distant from the reception desk.

Further, in the system of the Patent Literature 1, the RFID readers installed at various places of the facility read information stored in an RFID tag of a room key, and send the information to the server via the network. Accordingly, for example, in the case where the server is placed outside the facility and the RFID readers installed at various places inside the facility are connected to the server placed outside the facility via the Internet, read information is transmitted over the Internet each time when an RFID reader reads information from the RFID tag of a room key. This increases the security risk.

The present invention has been made taking the above situation into consideration. An object of the invention is to reduce the security risk while improving convenience in a utilization control technique for controlling use of an usage target object whose use can be restricted by locking and unlocking, access control, or encrypting and decrypting, the usage target object including real estate such as a hotel, an inn, a guesthouse, a house, a warehouse, or a room, a moving body such as an automobile or a bicycle, and a browsing terminal for an electronic medium containing an electronic health record or an electronic book, for example.

Solution to Problem

To solve the above problems, the present invention provides a use permit issuing device that issues a use permit that includes conditions for using a usage target object, a utilization control device and a use permit notification device that are provided for each of usage target objects, wherein the utilization control device controls use of the usage target object based on a use permit by locking/unlocking, by access control, or by encrypting/decrypting and the use permit notification device notifies the use permit to the utilization control device, and a setting terminal that sets the use permit in the use permit notification device.

The use permit issuing device stores, for each user, at least one type of authentication data together with an authentication method of the authentication data in question in association with at least one type of identification information such as a mail address, a mobile phone number, an employee number, or a membership number. Further, the use permit issuing device stores, for each usage target object, a secret key used for signing a use permit. Then, on receiving from the setting terminal a use permit issue request that includes user's identification information, designation of a usage target object, specifying information that can identify an authentication method employed by the use permit notification device corresponding to the usage target object, and use conditions for using the usage target object, the use permit issuing device issues a use permit that includes the use conditions included in the use permit issue request. At the same time, the use permit issuing device generates a signature on the use permit by using a secret key associated with the usage target object designated in the use permit issue request. Further, the use permit issuing device identifies authentication data of the authentication method identified by the specifying information included in the use permit issue request among authentication data associated with the user's identification information included in the use permit issue request, and notifies the use permit and the signature together with the identified authentication data to the setting terminal.

When the setting terminal receives the use permit, the signature, and the authentication data from the use permit issuing device as a response to the use permit issue request, the setting terminal registers the use permit, the signature, and the authentication data associating with one another that received from the use permit issuing device in the use permit notification device corresponding to the usage target object included in use permit issue request.

In the use permit notification device, the use permit and the signature are registered in association with the authentication data. Then, when the use permit notification device acquires authentication data, the use permit notification device identifies a use permit and a signature associated with the acquired authentication data among the use permits and the signatures stored in the use permit notification device itself to send the identified use permit and signature to the utilization control device that is the pair to the use permit notification device itself via Near Field Communication.

The utilization control device can communicate via the Near Field Communication, and is separated from any network. In the utilization control device, is set hole data that includes a public key needed to verify the use permit (a public key that is the pair to a secret key used for signing the use permit). When the utilization control device receives the use permit and the signature from the use permit notification device that is the pair to the utilization control device itself, the utilization control device verifies the signature by using the public key included in the hole data to acquire the use conditions included in the use permit if the signature verification is established. Then, if the acquired use conditions are satisfied, the utilization control device lifts restriction on use of the usage target object.

For example, the present invention provides a utilization control system for controlling use of usage target objects, comprising:
  a use permit issuing device that issues a use permit including use conditions for using one of the usage target objects;
  a utilization control device and a use permit notification device that are provided for each of the usage target objects, wherein the utilization control device controls use of the usage target object based on the use permit by locking/unlocking, by access control, or by encrypting/decrypting and the use permit notification device notifies the use permit to the utilization control device; and
  a setting terminal that sends a use permit issue request including designation of the usage target object to the use permit issuing device according to an instruction of an operator, so as to acquire setting information including the use permit from the use permit issuing device, and notifies the acquired setting information to the use permit notification device that is provided correspondingly to the usage target object designated in the use permit issue request;
wherein,
  the use permit issuing device comprises:
  an authentication data storage means that stores, for each user, at least one type of authentication data together with an authentication method of the authentication data in question in association with at least one type of identification information;
  a key information storage means that stores, for each of the usage target objects, key information including a secret key used for signing the use permit;
  a use permit issuing means that, on receiving from the setting terminal a use permit issue request including user's identification information, designation of a usage target object, specifying information that can identify an authentication method employed by the use permit notification device corresponding to the usage target object, and use conditions for using the usage target object, issues the use permit including the use conditions included in the use permit issue request;
  a signature generation means that generates a signature on the use permit issued by the use permit issuing means, by using the secret key included in the key information stored in the key information storage means in association with the usage target object designated in the use permit issue request;
  an authentication data identification means that identifies the authentication data of the authentication method identified by the specifying information included in the use permit issue request, among the authentication data stored in the authentication data storage means in association with the user's identification information included in the use permit issue request; and
  a setting information sending means that sends setting information including the use permit issued by the use permit issuing means, the signature generated by the signature generation means, and the authentication data identified by the authentication data identification means, to the setting terminal that is the sender of the use permit issue request;
  the use permit notification device comprises:
  a setting information storage means that stores the setting information notified from the setting terminal;
  an authentication data acquisition means that acquires the authentication data from a user according to a predetermined authentication method;
  a setting information searching means that searches the setting information storage means for the setting information including the authentication data acquired by the authentication data acquisition means; and
  a use permit sending means that sends the use permit and the signature included in the setting information retrieved by the setting information searching means to the utilization control device that is the pair to the use permit notification device itself via Near Field Communication; and the utilization control device can communicate only via the Near Field Communication and comprises:

a hole data storage means that stores hole data including a public key used for verification of the use permit;

a use conditions acquisition means that verifies the signature received together with the use permit from the use permit notification device by using the public key included in the hole data stored in the hole data storage means to acquire the use conditions included in the use permit when the verification being established; and a lifting means that lifts restriction on use of the usage target object when the use conditions acquired by the use conditions acquisition means being satisfied.

Advantageous Effects of Invention

In the present embodiment, the use permit issuing device stores, for each user, authentication data together with the authentication method of the authentication data in association with at least one type of identification information. When the use permit issuing device receives a use permit issue request from the setting terminal, the use permit issuing device issues a use permit to generate a signature on the use permit, and identifies the authentication data of the authentication method identified by the specifying information included in the use permit issue request among the authentication data associated with the user's identification information to notify the use permit and the signature together with the identified authentication data to the setting terminal. Then, the setting terminal registers the use permit, the signature, and the authentication data received from the use permit issuing device associating with one another in the use permit notification device. Accordingly, even in the case where a user uses a usage target object for the first time, the user does not need to register his own authentication data in the service provider who provides the service for using the usage target object if this user's authentication data of the authentication method employed by the use permit notification device corresponding to the usage target object has registered in the use permit issuing device.

Further, by previously registering the user's use permit in association with the user's authentication data in the use permit notification device, it becomes possible for the user to use the usage target object under the conditions included in the use permit by making the use permit notification device read his authentication data. Accordingly, in the case where a group of users use a usage target object, each user of the group can freely use the facility or the like under the use conditions included in his own use permit, and thus it is not needed to determine a representative among the group of users to entrust him management of a room key or the like and locking and unlocking or the facility.

Further, in the present invention, the utilization control device lifts restriction on use of the usage target object only if the use conditions included in the use permit are satisfied, and does not lift the restriction if the use conditions are not satisfied. Accordingly, by making a use permit include use conditions such as an expiration date, the number of times of use, or the like, the use permit becomes ineffective in a situation in which the use conditions are not satisfied even if the use permit itself is verified to be valid. Accordingly, it is not needed to make the user return the use permit.

Thus, according to the present invention, the convenience is improved.

Further, in the present invention, the utilization control device can communicate via Near Field Communication, and is separated from any network. Thus, the utilization control device is not attacked from the outside via a network such as the Internet. Further, a use permit used for lifting restriction on use of a usage target object is validated by verifying the signature added to the use permit by using the public key included in the hole data. Thus, according to the present invention, the security risk is decreased.

Thus, according to the present invention, it is possible to improve the convenience while reducing the security risk in a utilization control technique for controlling use of a usage target object whose use can be restricted by locking/unlocking, by access control, or by encrypting/decrypting.

BRIEF DESCRIPTION OF DRAWINGS

FIG. 5 is a diagram showing schematically an example of contents registered in an identification information table 1030;

FIG. 6 is a diagram showing schematically an example of contents registered in an authentication data table 1031;

FIG. 7 is a diagram showing schematically an example of contents registered in a key information storage part 104;

FIG. 12 is a diagram showing schematically an example of contents registered in a setting information storage part 43;

FIG. 14 is a diagram showing schematically an example of contents registered in an account information table 1033.

DESCRIPTION OF EMBODIMENTS

Figure 1:
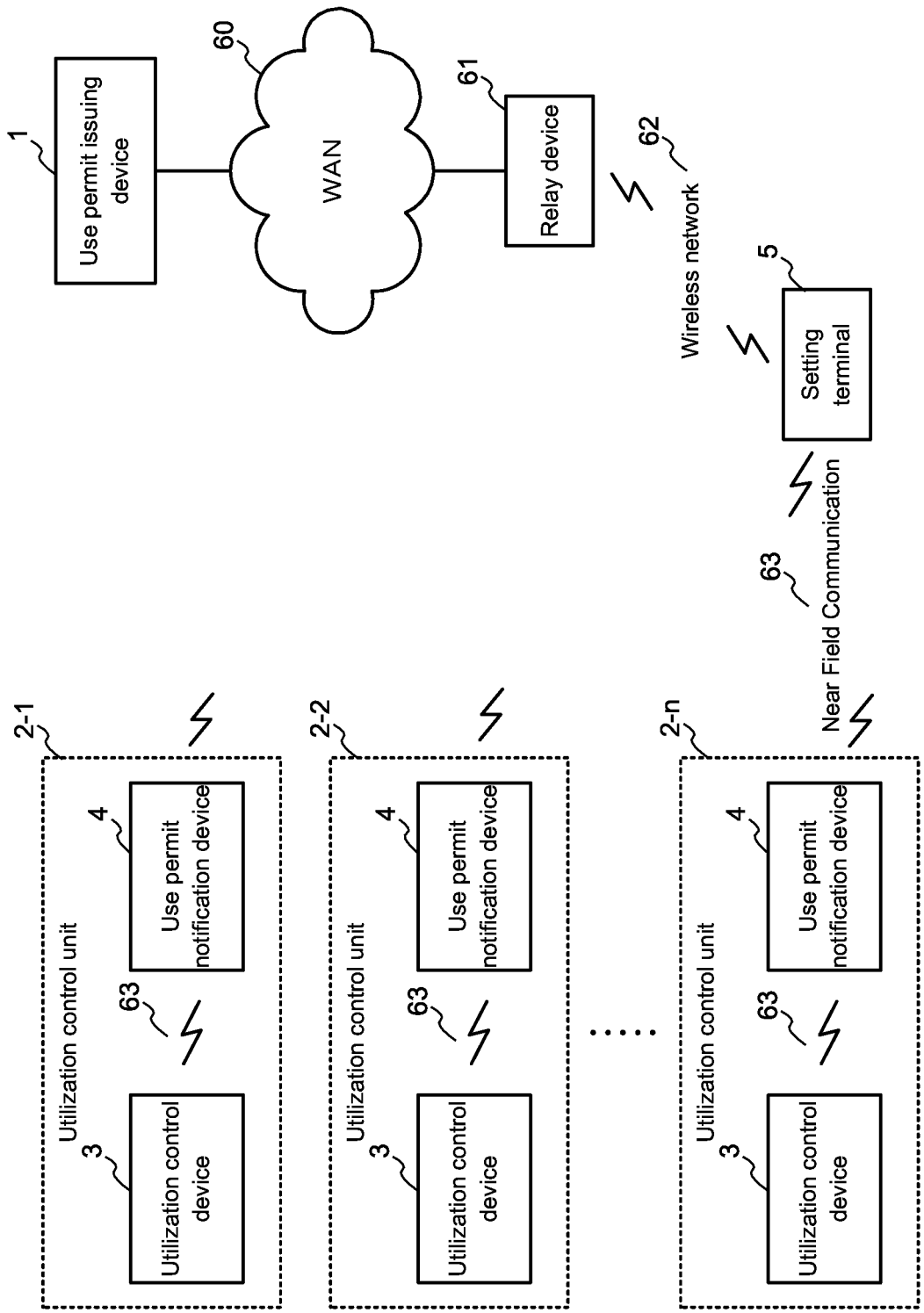
FIG. 1 is a schematic configuration diagram showing a utilization control system according to one embodiment of the present invention.

In the following, one embodiment of the present invention will be described referring to the drawings.

FIG. 1 is a schematic configuration diagram showing a utilization control system according to the present embodiment.

As shown in the figure, the utilization control system of the present embodiment comprises a use permit issuing device 1 that issues a use permit containing conditions (use conditions) for using an usage target object such as real estate such as a hotel, an inn, a guesthouse, a house, a warehouse, or a room, or a moving body such as an automobile or a bicycle, or a browsing terminal for an electronic medium containing an electronic medical record, an electronic book, or the like, utilization control units 2-1-2-*n* (hereinafter, also simply referred to as utilization control units 2) that are provided for respective usage target objects, and a setting terminal 5. Further, each utilization control unit 2 comprises a utilization control device 3 that controls use of a usage target object by locking and unlocking, access control, or encrypting and decrypting based on a use permit, and a use permit notification device 4 that notifies a use permit to the utilization control device 3 that is the pair to the use permit notification device 4 itself.

The use permit issuing device 1 is connected to a Wide Area Network (WAN) 60, and stores, for each user, at least one type of authentication data together with its authentication method (such as face authentication, vein authentication, or password authentication), being associated with at least one type of identification information such as a mail address, a mobile phone number, an employee number, or a membership number. Further, the use permit issuing device 1 stores, for each usage target object, key information including a secret key to use for signing a use permit and a common key to use for encrypting use conditions contained in a use permit.

Each utilization control device 3 can communicate only via Near Field Communication 63 such as IrDA (Infrared Data Association), Bluetooth (registered trademark), or the like, and is separated from any network. Further, in each utilization control device 3, is set hole data that includes a public key needed for verification of signature of a use permit and a common key needed for decryption of use conditions.

In each use permit notification device 4, is registered at least one piece of setting information that includes a use permit, a signature on the use permit, and authentication data of the user.

The setting terminal 5 is provided, for example, for each service provider who provides a service for using a usage target object. The setting terminal 5 is connected to the WAN 60 via a wireless network 62 and a relay device 61 such as a wireless base station or an access point, and acquires setting information from the use permit issuing device 1. Then, the setting terminal 5 sends and registers the acquired setting information to a use permit notification device 4 via Near Field Communication 63.

Figure 2:
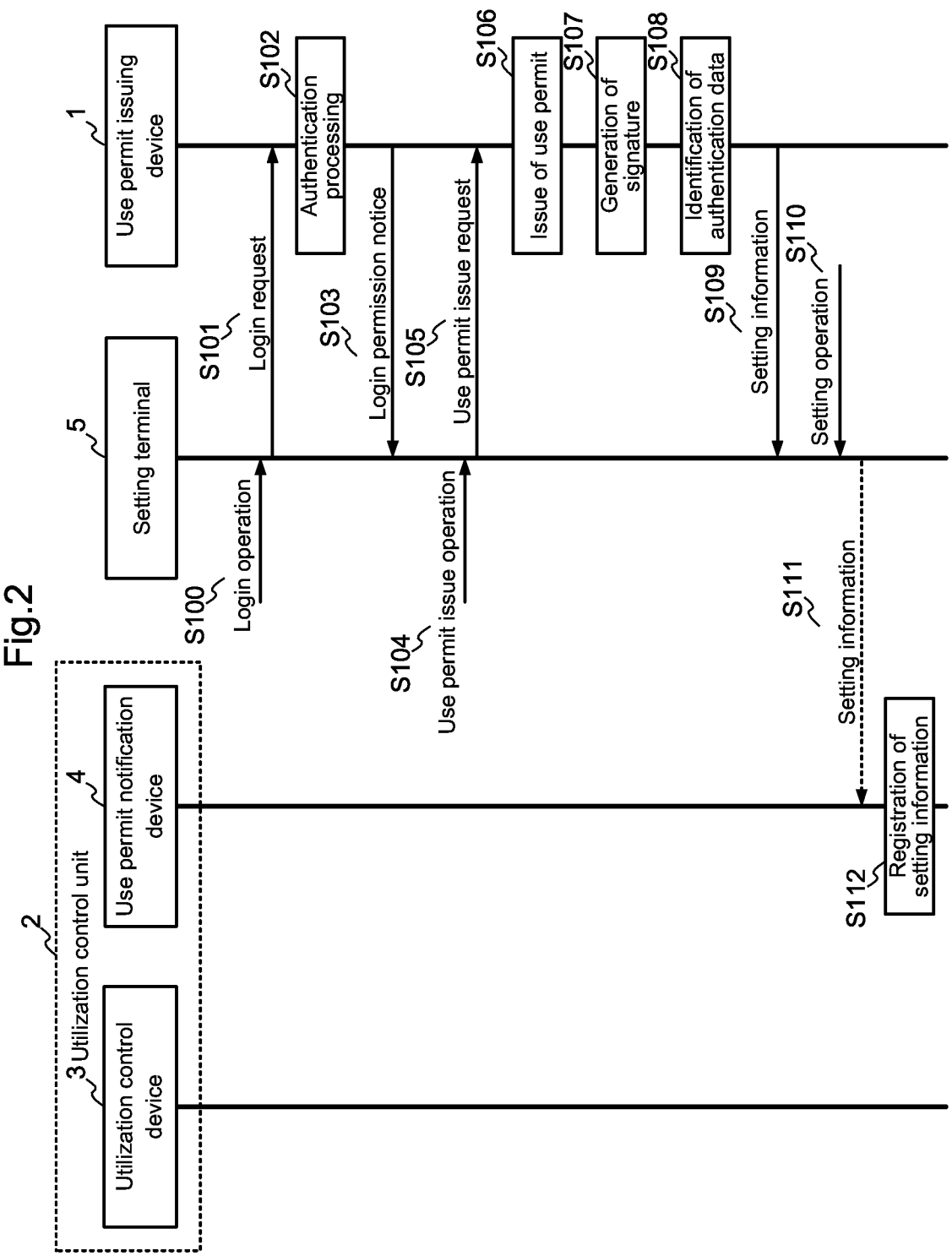
FIG. 2 is a sequence diagram showing an example of a setting information registration operation for registering setting information into a use permit notification device 4.

FIG. 2 is a sequence diagram showing an example of a setting information registration operation for registering setting information into a use permit notification device 4.

Here, it is assumed that the service provider has received and permitted a use permission request accompanied by designation of a usage target object and use conditions (start and end dates for use, and the like) from a user by e-mail, mobile phone, or the like.

First, when the setting terminal 5 receives a login operation from the service provider (S100), the setting terminal 5 sends a login request including login information (user ID and password) of the service provider, to the use permit issuing device 1 (S101). Receiving the login request, the use permit issuing device 1 performs authentication processing by using the password included in the login request and the password that the use permit issuing device 1 manages in association with the user ID included in the login request (S102). When the authentication is established, the use permit issuing device 1 permits login of the setting terminal 5 that is the sender of the login request, and sends a login permission notification to the setting terminal 5 (S103).

Next, when the setting terminal 5 receives from the service provider a use permit issue operation with an object ID that is identification information of the usage target object designated in the use permission request, an authentication method (biometric authentication (face authentication, vein authentication, or the like), password authentication, or the like) that is employed by the use permit notification device 4 of the utilization control unit 2 corresponding to the usage target object, use conditions designated by the use permission request, and identification information of the user who requested the use permission request (a mail address, a mobile phone number, an employee number, a membership number, or the like) that is grasped by the service provider (S104), then the setting terminal 5 generates a use permit issue request accompanied by designation of the mentioned information to send the use permit issue request to the use permit issuing device 1 (S105).

Receiving the use permit issue request, the use permit issuing device 1 issues a use permit that contains the use conditions designated in the use permit issue request (S106). Further, the use permit issuing device 1 encrypts the use conditions contained in the issued use permit by using the common key included in the key information stored in association with the object ID designated in the use permit issue request, and at the same time generates a signature on the use permit by using the secret key included in the key information (S107). In detail, the use permit, or a predetermined part of the use permit, or their message digest is encrypted with the secret key, and the encrypted information is used as the signature.

Further, the use permit issuing device 1 identifies authentication data of the authentication method designated in the use permit issue request, among the authentication data stored in association with the user's identification information designated in the use permit issue request (S108).

Then, the use permit issuing device 1 generates setting information that contains the use permit issued as described above, the generated signature, and the identified authentication data to send the setting information to the setting terminal 5 that is the sender of the use permit issue request (S109).

Next, when the setting terminal 5 receives a setting operation from the service provider in a state that the setting terminal 5 is made close to the use permit notification device 4 of the utilization control unit 2 corresponding to the usage target object designated in the use permission request received from the user (S110), the setting terminal 5 sends the setting information received from the use permit issuing device 1 to the use permit notification device 4 via Near Field Communication 63 (S111). Receiving the setting information, the use permit notification device 4 registers the setting information received from the setting terminal 5 (S112).

Figure 3:
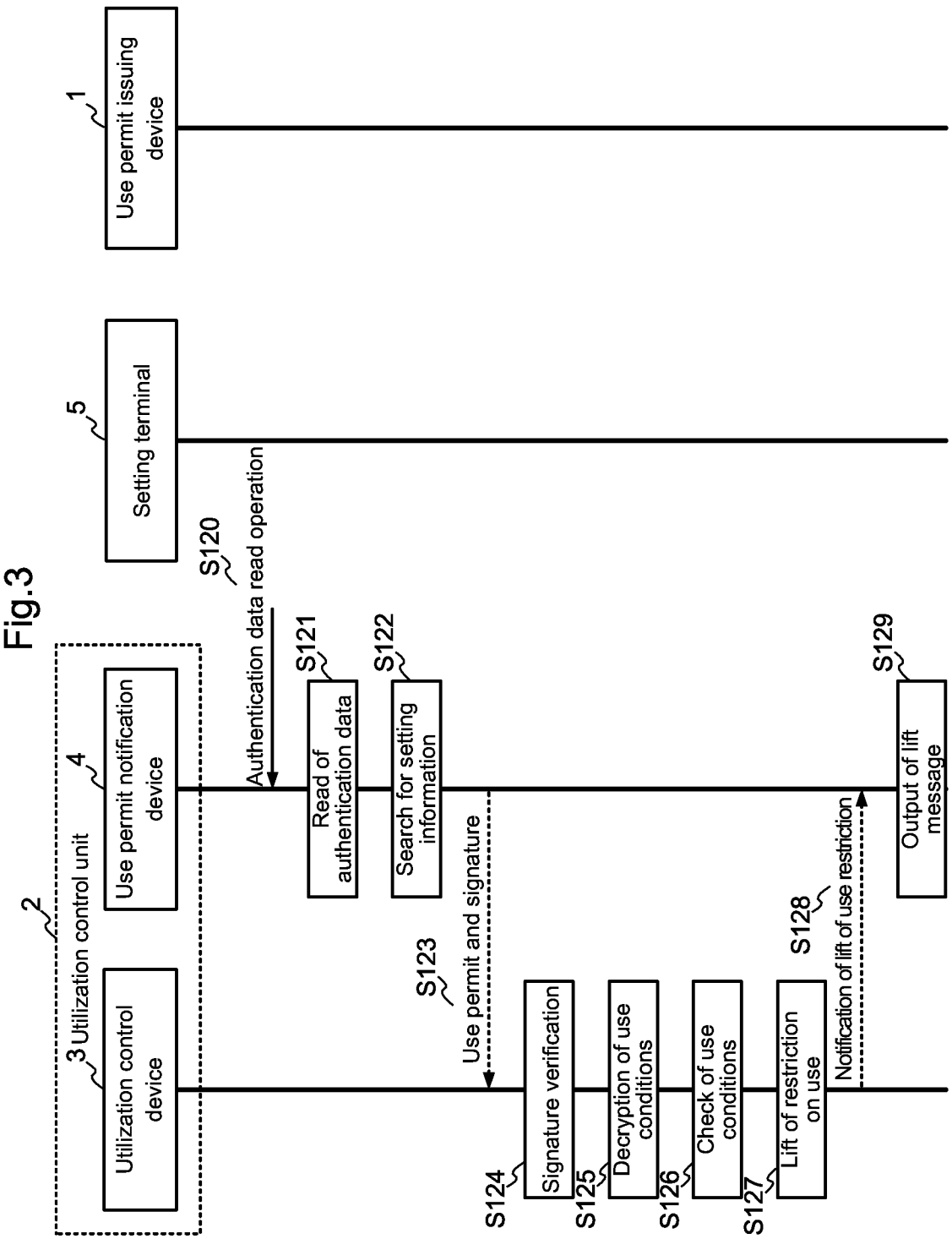
FIG. 3 is a sequence diagram showing an example of a use restriction lifting operation by a utilization control device 3 for lifting restriction on use of an usage target object.

FIG. 3 is a sequence diagram showing an example of a use restriction lifting operation by a utilization control device 3.

First, when the user comes close to the use permit notification device 4 of the utilization control unit 2 associated with the usage target object whose use has been permitted by the service provider to perform an authentication data read operation for making the use permit notification device 4 read authentication data of the user (S120), the use permit notification device 4 reads the authentication data from the user according to a predetermined authentication method such as biometric authentication (face authentication, vein authentication, or the like), password authentication, or the like (S121). After that, the use permit notification device 4 searches for setting information including the authentication data read from the user (S122). Then, the use permit notification device 4 sends the use permit and the signature included in the retrieved setting information to the utilization control device 3 that is the pair to the use permit notification device 4 itself via Near Field Communication 63 (S123).

Receiving the use permit and the signature, the utilization control device 3 verifies the signature received together with the use permit via Near Field Communication 63 from the use permit notification device 4 by using the public key included in the hole data set in the device 3 itself (S124). If the signature verification is established, the utilization control device 3 decrypts the use conditions that has been encrypted (hereinafter, referred to as encrypted use conditions) included in use permit by using the common key included in the hole data (S125).

Next, the utilization control device 3 checks whether the decrypted use conditions are satisfied (S126). For example, in the case where the use conditions are the start and end times for use, the utilization control device 3 checks whether the present date is during the period specified by the start and end times for use. When it is confirmed that the use conditions are satisfied, the utilization control device 3 lifts the restriction on use of the usage target object (S127). For example, in the case where the usage target object is real estate such as a hotel, an inn, a guesthouse, a house, a warehouse, or a room, the utilization control device 3 unlocks an automatic lock of the entrance of the real estate.

Thereafter, the utilization control device 3 sends a use restriction lift notification to the use permit notification device 4 via Near Field Communication 63 (S128). Receiving this, the use permit notification device 4 performs predetermined lift message output processing such as displaying or outputting a message that the restriction on use of the usage target object has been lifted (S129).

Next, details will be described of the use permit issuing device 1 and the utilization control unit 2 as the components of the utilization control system of the present embodiment. As the setting terminal 5, can be used an existing mobile terminal having the Near Field Communication function such as a smartphone or a tablet terminal, and therefore detailed description of the setting terminal 5 will be omitted.

First, the use permit issuing device 1 will be described in detail.

Figure 4:
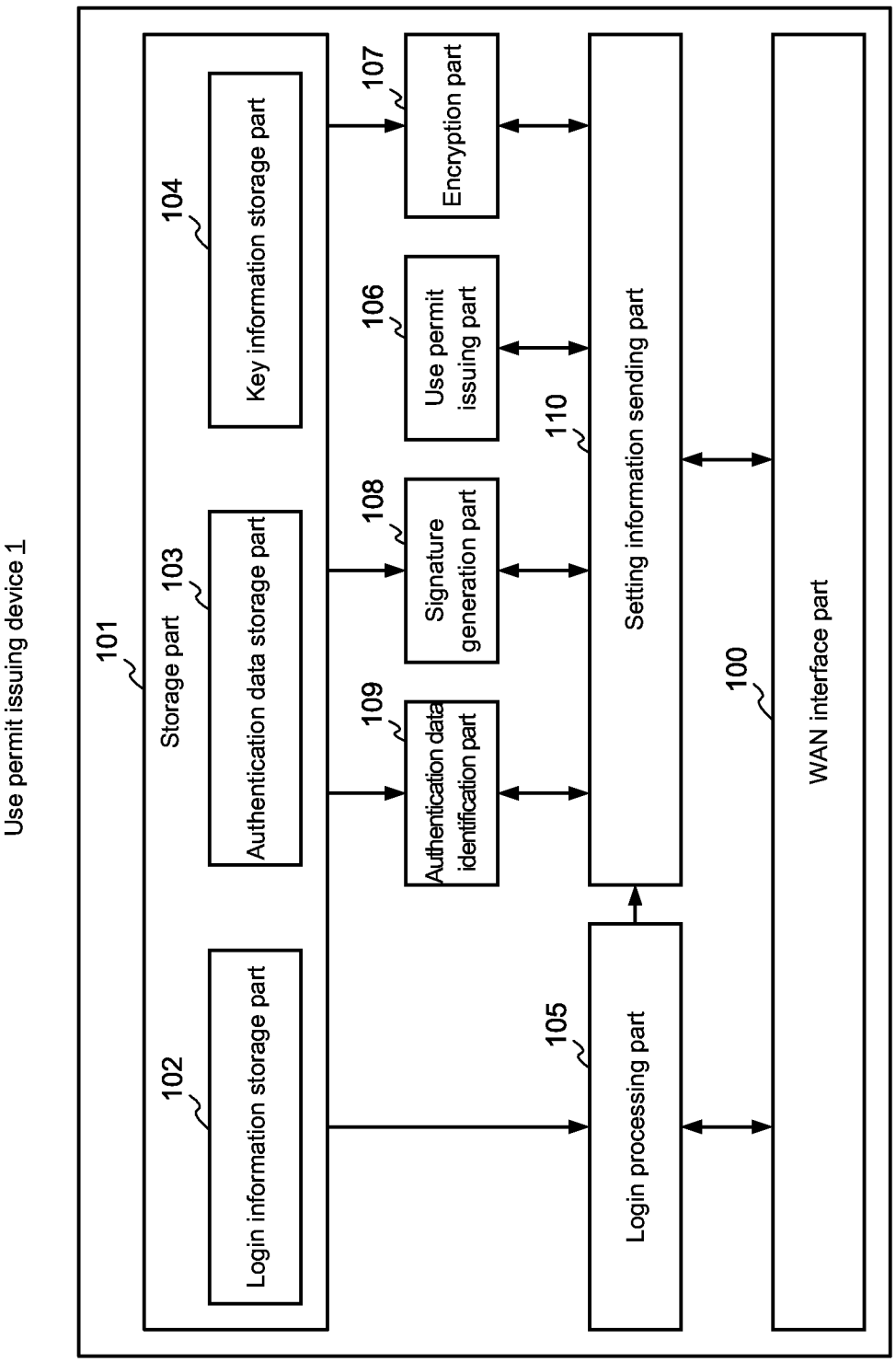
FIG. 4 is a schematic functional configuration diagram of a use permit issuing device 1.

FIG. 4 is a schematic functional configuration diagram of the use permit issuing device 1.

As shown in the figure, the use permit issuing device 1 comprises a WAN interface part 100, a storage part 101, a login processing part 105, a use permit issuing part 106, an encryption part 107, a signature generation part 108, an authentication data identification part 109, and a setting information sending part 110.

The WAN interface part 100 is an interface for connecting to the WAN 60.

The storage part 101 comprises a login information storage part 102, an authentication data storage part 103, and a key information storage part 104.

The login information storage part 102 stores, for each service provider, login information (use ID, password) for logging in to the use permit issuing device 1.

The authentication data storage part 103 stores, for each user, an identification information table 1030 and an authentication data table 1031 that are described in the following.

FIG. 5 is a diagram showing schematically an example of contents registered in the identification information table 1030.

As shown in the figure, the identification information table 1030 is provided for each user, being associated with a root ID 1032 given to the user concerned. The identification information table 1030 stores a record 10301 of identification information of the user. Each record 10301 of identification information has a field 10302 for registering a type/intended-use of identification information, such as a mail address, a mobile phone number, an employee number, a membership number, or the like and a field 10303 for registering the user's identification information.

FIG. 6 is a diagram showing schematically an example of contents registered in the authentication data table 1031.

As shown in the figure, the authentication data table 1031 is provided for each user, being associated with a root ID 1032 given to the user concerned. The authentication data table 1031 stores a record 10311 of authentication data of the user. Each record 10311 of authentication data has a field 10312 for registering an authentication method such as face authentication, vein authentication, password authentication, or the like and a field 10313 for registering user's authentication data.

The key information storage part 104 stores key information for each usage target object.

FIG. 7 is a diagram showing schematically an example of contents registered in the key information storage part 104.

As shown in the figure, the key information storage part 104 stores a record 1040 of key information for each usage target object. Each record 1040 has a field 1041 for registering an object that is identification information of a usage target object, a field 1042 for registering a secret key used for signing on a use permit for the utilization control unit 2 corresponding to the usage target object, a field 1043 for registering a public key that is the pair to the secret key, and a field 1044 for registering a common key used for encrypting and decrypting of the use conditions included in the use permit.

The login processing part 105 processes a login request received from the setting terminal 5 by referring to the login information storage part 102.

The use permit issuing part 106 issues a use permit that includes encrypted use conditions received from the setting information sending part 110, in accordance with instructions from the setting information sending part 110.

The encryption part 107 encrypts use conditions received from the setting information sending part 110 in accordance with instructions from the setting information sending part 110 to generate encrypted use conditions, by using a common key included in key information stored in the key information storage part 104 in association with an object ID received from the setting information sending part 110.

The signature generation part 108 generates a signature on a use permit received from the setting information sending part 110 in accordance with instructions from the setting information sending part 110, by using a secret key included in key information stored in the key information storage part 104 in association with an object ID received from the setting information sending part 110.

The authentication data identification part 109 identifies authentication data associated with user's identification information and authentication method that are received from the setting information sending part 110 in accordance with instructions from the setting information sending part 110, by referring to the authentication data storage part 103.

In accordance with a use permit issue request received from the setting terminal 5 via the WAN interface part 100, the setting information sending part 110 issues a use permit that includes encrypted use conditions generated from use conditions included in the use permit issue request, in cooperation with the use permit issuing part 106 and the encryption part 107. At the same time, the setting information sending part 110 generates a signature on the use permit in cooperation with the signature generation part 108. Further, in cooperation with the authentication data identification part 109, the setting information sending part 110 identifies from the authentication data storage part 103 the authentication data of the authentication method included in the use permit issue request with respect to the user identified by the identification information included in the use permit issue request. Then, the setting information sending part 110 sends setting information that contains the use permit, the signature, and the authentication data to the setting terminal 5.

The schematic functional configuration of the use permit issuing device 1 shown in FIG. 4 may be implemented by hardware by using an integrated logic IC such as an Application Specific Integrated Circuit (ASIC), a Field Programmable Gate Array (FPGA), or the like, or may be implemented by software on a computer device such as a Digital Signal Processor (DSP). Or the schematic functional configuration may be implemented by a general-purpose computer comprising a Central Processing Unit (CPU), a memory, an auxiliary storage such as a flash memory or a hard disk drive, and a communication unit such as a Network Interface Card (NIC), when the CPU loads a predetermined program from the auxiliary storage into the memory and executes the program. Further, the schematic functional configuration may be implemented by a distributed system comprising a plurality of general-purpose computers that cooperate with one another.

Figure 8:
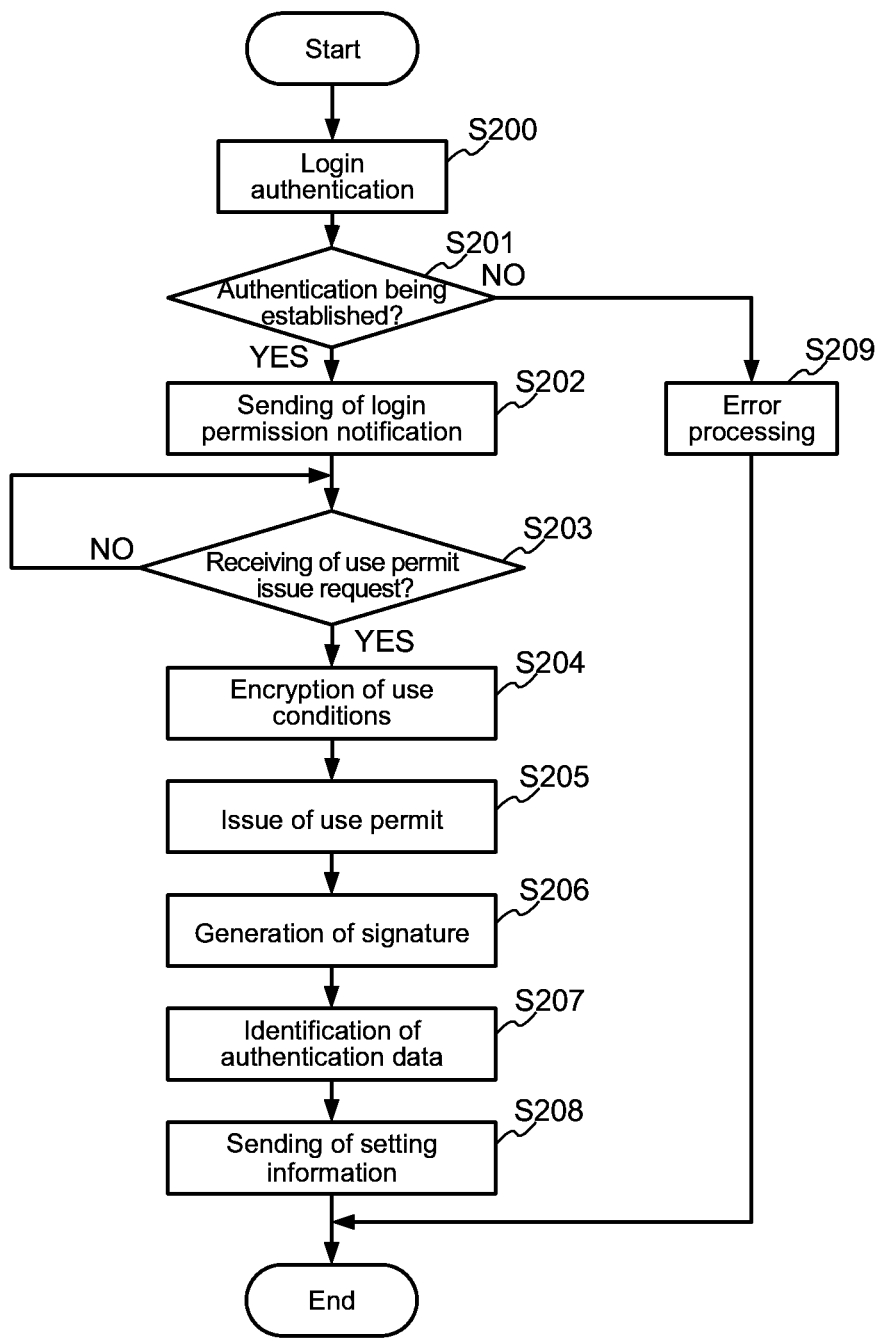
FIG. 8 is a flowchart for explaining operation of the use permit issuing device 1.

FIG. 8 is a flowchart for explaining operation of the use permit issuing device 1.

The flow is started when the WAN interface part 100 receives a login request from the setting terminal 5 via the WAN 60.

First, the WAN interface part 100 notifies the login processing part 105 of the received login request. Receiving this, the login processing part 105 performs login authentication (S200). In detail, the login processing part 105 searches for a password that is stored in the login information storage part 102 in association with the service provider's user ID included in the login request. When the retrieved password coincides with the password included in the login request, the login processing part 105 permits the login (authentication is established), and otherwise rejects the login (authentication is not established).

Next, when the login authentication is not established (NO in S201), the login processing part 105 performs a predetermined error processing such as sending of an error message to the setting terminal 5 that is the sender of the login request via the WAN interface part 100 (S209).

On the other hand, when the login authentication is established (YES in S201), the login processing part 105 sends a login permission notification to the setting terminal 5 that is the sender of the login request (S202). Then, the setting information sending part 110 awaits sending of a use permit issue request from the setting terminal 5 that has permitted the login, via the WAN interface part 100 (S203).

When the setting information sending part 110 receives a use permit issue request via the WAN interface part 100 from the setting terminal 5 that has permitted the login (YES in S203), the setting information sending part 110 delivers the object ID of the usage target object and the use conditions included in the use permit issue request to the encryption part 107 to instruct the encryption part 107 to generate encrypted use conditions. Receiving the instruction, the encryption part 107 searches the key information storage part 104 for a record 1040 of key information by using, as a key, the object ID received from the setting information sending part 110. Then, by using the common key registered in the field 1044 of the retrieved record 1040, the encryption part 107 encrypts the use conditions received from the setting information sending part 110 to generate encrypted use conditions (S204).

Next, the setting information sending part 110 delivers the object ID of the usage target object and the user's identification information that are included in the use permit issue request and the encrypted use conditions generated by the encryption part 107 to the use permit issuing part 106 to instruct issuance of a use permit to the use permit issuing part 106. Receiving the instruction, the use permit issuing part 106 issues a use permit including the object ID of the usage target object, the user's identification information, and the encrypted use conditions that are received from the setting information sending part 110 (S205).

Next, the setting information sending part 110 delivers the object ID of the usage target object included in the use permit issue request and the use permit issued by the use permit issuing part 106 to the signature generation part 108 to instruct generation of a signature to the signature generation part 108. Receiving the instruction, the signature generation part 108 searches the key information storage part 104 for a record 1040 of key information by using, as a key, the object ID received from the setting information sending part 110. Then, by using the secret key registered in the field 1042 of the retrieved record 1040, the signature generation part 108 generates a signature on the use permit received from the setting information sending part 110 (S206). In detail, the signature generation part 108 encrypts the use permit, a predetermined part of the use permit, or their message digest is encrypted with the secret key, and the encrypted information is used as the signature.

Further, the setting information sending part 110 delivers the user's identification information and authentication method that are included in the use permit issue request to the authentication data identification part 109 to instruct identification of the use's authentication data to the authentication data identification part 109. Receiving the instruction, the authentication identification part 109 refers to the authentication data storage part 103 to identify the user's authentication data that is associated with the user's identification information and authentication method received from setting information sending part 110 (S207). In detail, the authentication identification part 109 searches the authentication data storage part 103 for an identification information table 1030 that has a record 10301 of identification information whose field 10303 registers the user's identification information received from the setting information sending part 110. Then, the authentication identification part 103 searches the authentication data table 1031 stored in the authentication data storage part 103 in association with a root ID 1032 associated with the retrieved identification information table 1030 for a record 10311 of authentication data whose field 10312 registers the authentication method received from the setting information sending part 110 to identify the user's authentication data registered in the field 10313 of the retrieved record 10311.

Then, the setting information sending part 110 generates setting information that contains the use permit issued by the use permit issuing part 106, the signature generated by the signature generation part 108, and the user's authentication data identified by the authentication data identification part 109. Then, the setting information sending part 110 sends the setting information to the setting terminal 5 that is the sender of the use permit issue request via the WAN interface part 100 (S208).

Next, the utilization control unit 2 will be described in detail.

As described above, each utilization control unit 2 comprises a utilization control device 3 and a use permit notification device 4.

First, the utilization control device 3 will be described in detail.

Figure 9:
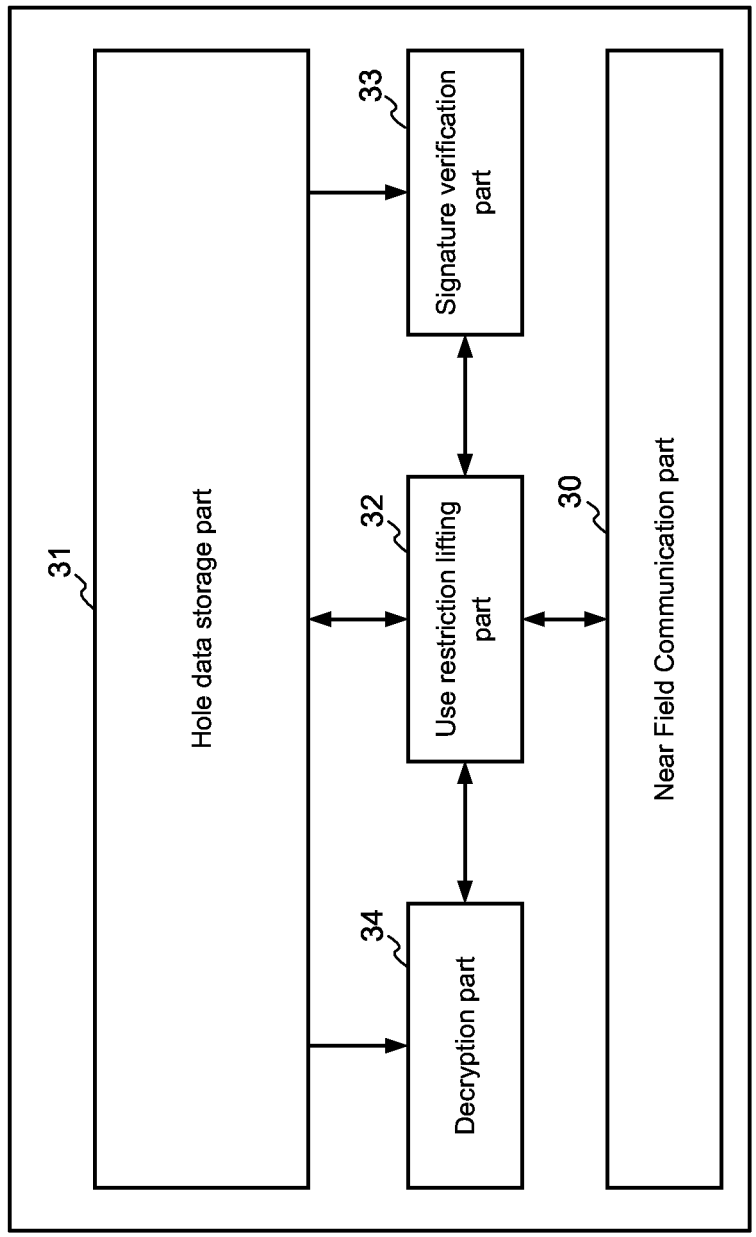
FIG. 9 is a schematic functional configuration diagram of the utilization control device 3.

FIG. 9 is a schematic functional configuration diagram of the utilization control device 3.

As shown in the figure, the utilization control device 3 comprises a Near Field Communication part 30, a hole data storage part 31, a use restriction lifting part 32, a signature verification part 33, and a decryption part 34.

The Near Field Communication part 30 communicates with the use permit notification device 4 via the Near Field Communication such as IrDA, Bluetooth (registered trademark), or the like.

The hole data storage part 31 stores hole data. Hole data includes a public key used for signature verification of a use permit and a common key for decrypting encrypted use conditions included in the use permit. These public key and common key are same as the public key and the common key registered in the record 1040 of key information stored in the key information storage part 104 of the use permit issuing device 1 in association with the object ID of the usage target object corresponding to the utilization control unit 2 that includes the utilization control device 3 having the hole data storage part 31 itself.

The use restriction lifting part 32 lifts restriction on use of the usage target object corresponding to the utilization control unit 2 that includes the utilization control device 3 having the use restriction lifting part 32 itself, when verification of a signature received together with a use permit from the use permit notification device 4 is established and the use conditions included in the use permit are satisfied. For example, in the case where the usage target object is real estate such as a hotel, an inn, a guesthouse, a house, a warehouse, or a room, the use restriction lifting part 32 outputs an unlocking instruction to the automatic lock installed at the door of the entrance of the real estate.

The signature verification part 33 verifies a signature on a use permit by using a public key included in hole data stored in the hole data storage part 31.

The decryption part 34 decrypts encrypted use conditions included in a use permit by using a common key included in hole data stored in the hole data storage part 31.

The schematic functional configuration of the utilization control device 3 shown in FIG. 9 may be implemented by hardware by using an integrated logic IC such as an ASIC, an FPGA, or the like, or may be implemented by software on a computer device such as a DSP. Or the schematic functional configuration may be implemented by a general-purpose computer comprising a CPU, a memory, an auxiliary storage such as a flash memory or a hard disk drive, and a Near Field Communication device such as an IrDA communication device, a Bluetooth (registered trademark) communication device, or the like, when the CPU loads a predetermined program from the auxiliary storage into the memory and executes the program.

Figure 10:
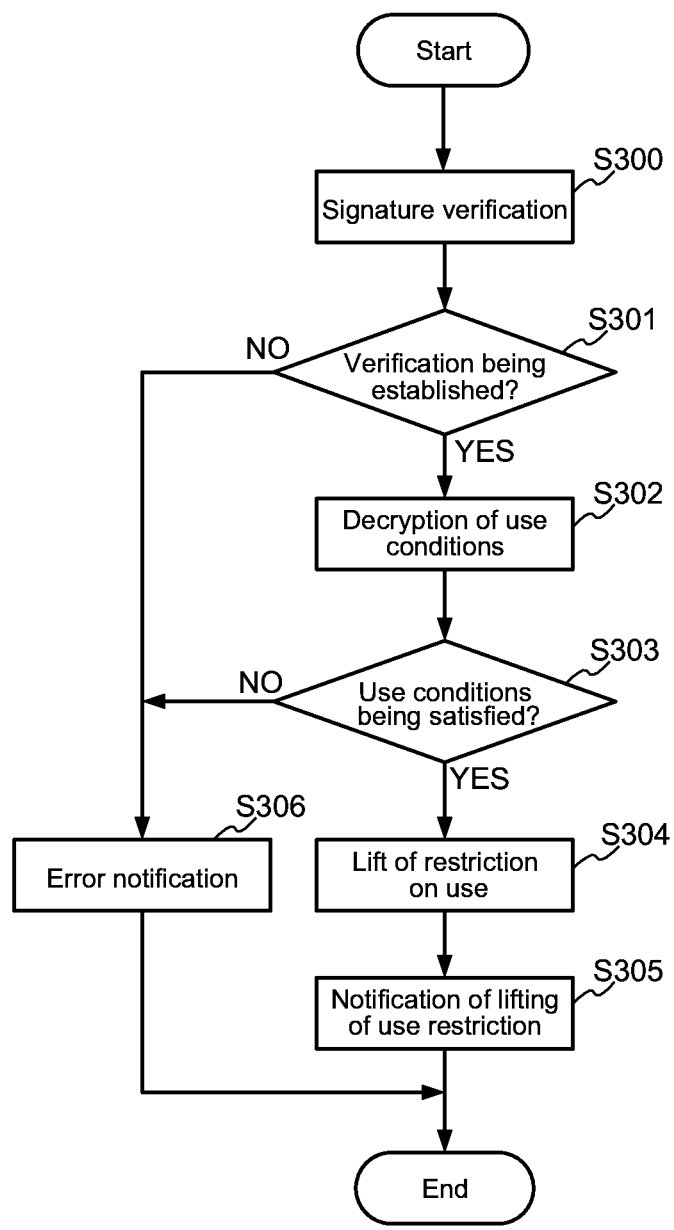
FIG. 10 is a flowchart for explaining operation of the utilization control device 3.

FIG. 10 is a flowchart for explaining operation of the utilization control device 3.

This flow is started when the Near Field Communication part 30 receives a use permit together with a signature from the use permit notification device 4 via Near Field Communication 63.

The use restriction lifting part 32 delivers the use permit and the signature received from the use permit notification part 4 via the Near Field Communication part 30 to the signature verification part 33 to instruct verification of the signature to the signature verification part 4. Receiving the instruction, the signature verification part 33 verifies the signature on the use permit by using the public key included in the hole data stored in the hole data storage part 31 (S300). In detail, the signature verification part 33 verifies validity of the signature by decrypting the signature by using the public key and by determining whether the decrypted information coincides with the use permit, the predetermined part of the use permit, or their message digest.

Next, the signature verification part 33 notifies the use restriction lifting part 32 of the result of the verification of the signature. Receiving this, the use restriction lifting part 32 delivers the encrypted use conditions included in the use permit to the decryption part 34 to instruct decryption of the encrypted use conditions to the decryption part 34, when the signature verification is established and the validity of the signature is authenticated (YES in S301) On the other hand, when the signature verification is not established and the validity of the signature is not authenticated (NO in S301), the use restriction lifting part 32 sends an error notification to the use permit notification device 4 via the Near Field Communication part 30 (S306).

Next, when the decryption part 34 receives the decryption instruction together with the encrypted use conditions from the use restriction lifting part 32, the decryption part 34 decrypts the encrypted use conditions by using the common key included in the hole data stored in the hole data storage part 31 (S302). Then, the decryption part 34 delivers the decrypted use conditions to the use restriction lifting part 32.

Receiving the decrypted use conditions, the use restriction lifting part 32 determines whether the decrypted use conditions are satisfied (S303). For example, in the case where the use conditions are start and end dates for use, the use restriction lifting part 32 determines whether the present data is within the period specified by the start and end times for use.

Next, when it is determined that the use conditions are satisfied (YES in S303), the use restriction lifting part 32 lifts the restriction on use of the usage target object corresponding to the utilization control unit 2 that includes the utilization control device 3 having the use restriction lifting part 32 itself (S304). For example, in the case where the usage target object is real estate such as a hotel, an inn, a guesthouse, a house, a warehouse, or a room, the use restriction lifting part 32 outputs an unlocking instruction to the automatic lock installed at the door of the entrance of the real estate. Then, the use restriction lifting part 32 sends a use restriction lift notification to the use permit notification device 4 via the Near Field Communication part 30 (S305).

On the other hand, when it is determined that the use conditions are not satisfied (NO in S303), the use restriction lifting part 32 sends an error notification to the use permit notification device 4 via the Near Field Communication part 30 (S306).

Next, the use permit notification device 4 will be described in detail.

Figure 11:
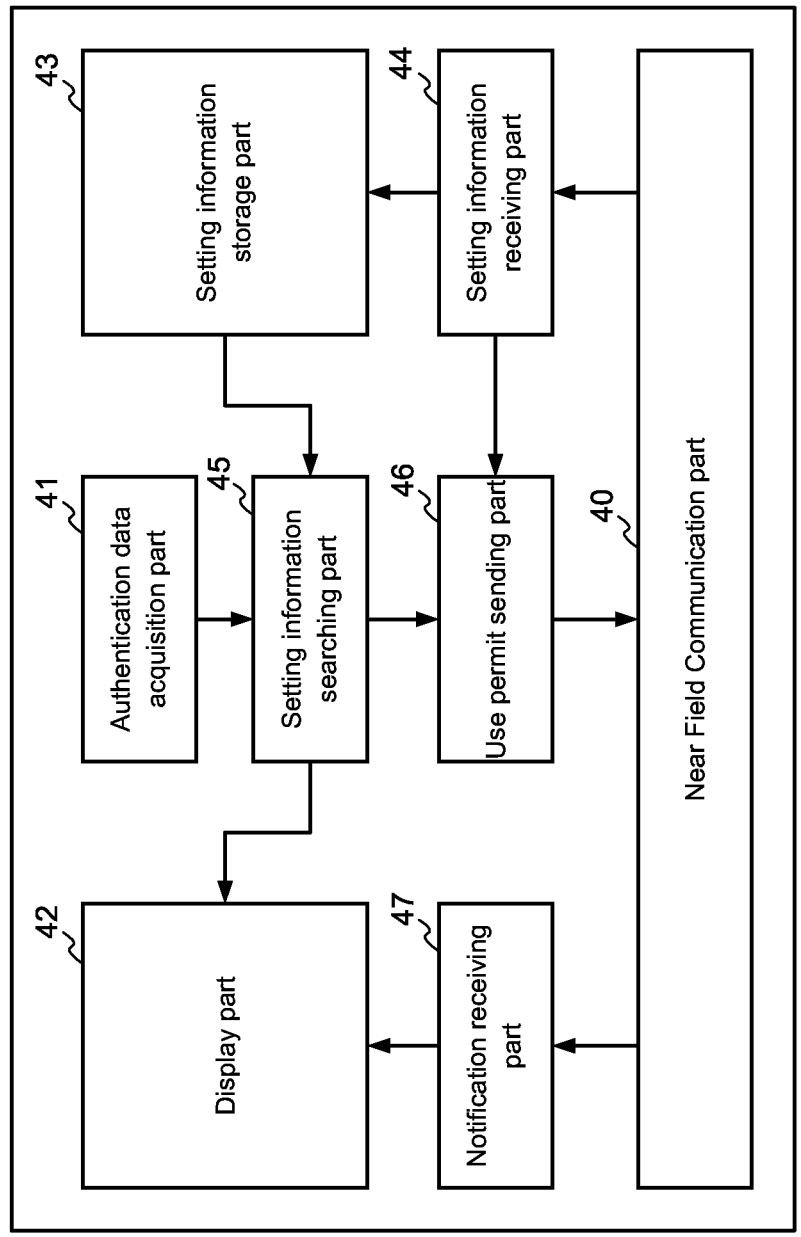
FIG. 11 is a schematic functional configuration diagram of the use permit notification device 4.

FIG. 11 is a schematic functional configuration diagram of the use permit notification device 4.

As shown in the figure, the use permit notification device 4 comprises a Near Field Communication part 40, an authentication data acquisition part 41, a display part 42 such as a Liquid Crystal Display (LCD), an organic Electro Luminescence (EL) display, or the like, a setting information storage part 43, a setting information receiving part 44, a setting information searching part 45, a use permit sending part 46, and a notification receiving part 47.

The Near Field Communication part 40 communicates with the utilization control device 3 and the setting terminal 5 via Near Field Communication 63 such as IrDA, Bluetooth (registered trademark), or the like.

The authentication data acquisition part 41 acquires authentication data from a user according to the predetermined authentication method such as face authentication, vein authentication, or password authentication. For example, in the case of face authentication, the authentication data acquisition part 41 is provided with a camera, and acquires face authentication data by taking an image of a user's face. In the case of vein authentication, the authentication data acquisition part 41 is provided with a vein sensor, and acquires vein authentication data by detecting a user's vein pattern. Or, in the case of password authentication, the authentication data acquisition part 41 is provided with an input device such as a keyboard or a touch panel, or a card reader, and receives input of a password from a user through the input device or reads a password from an ID card carried by a user.

The setting information is stored in the setting information storage part 43.

FIG. 12 is a diagram showing schematically an example of contents registered in the setting information storage part 43.

As shown in the figure, the setting information storage part 43 stores a record 430 of setting information. Each record 430 of setting information has a field 431 for registering authentication data, a field 432 for registering a use permit, and a field 433 for registering a signature on the use permit.

The setting information receiving part 44 receives setting information from the setting terminal 5 via the Near Field Communication part 40 to store the received setting information in the setting information storage part 43.

The setting information searching part 45 searches the setting information storage part 43 for a record 430 of setting information that includes authentication data acquired by the authentication data acquisition part 41.

The use permit sending part 46 sends a use permit and a signature included in a record 430 of setting information retrieved by the setting information searching part 45 to the utilization control device 3 that is the pair to the use permit notification device 4 of the use permit sending part 46 itself via the Near Field Communication part 40.

The notification receiving part 47 receives various notifications from the utilization control device 3 via the Near Field Communication part 40 to display these notifications on the display part 42.

Similarly to the utilization control device 3, the schematic functional configuration of the use permit notification device 4 shown in FIG. 11 also may be implemented by hardware by using an integrated logic IC such as an ASIC, an FPGA, or the like, or may be implemented by software on a computer device such as a DSP. Or the schematic functional configuration may be implemented by a general-purpose computer comprising a CPU, a memory, an auxiliary storage such as a flash memory or a hard disk drive, and a Near Field Communication device such as an IrDA communication device, a Bluetooth (registered trademark) communication device, or the like, when the CPU loads a predetermined program from the auxiliary storage into the memory and executes the program.

Figure 13:
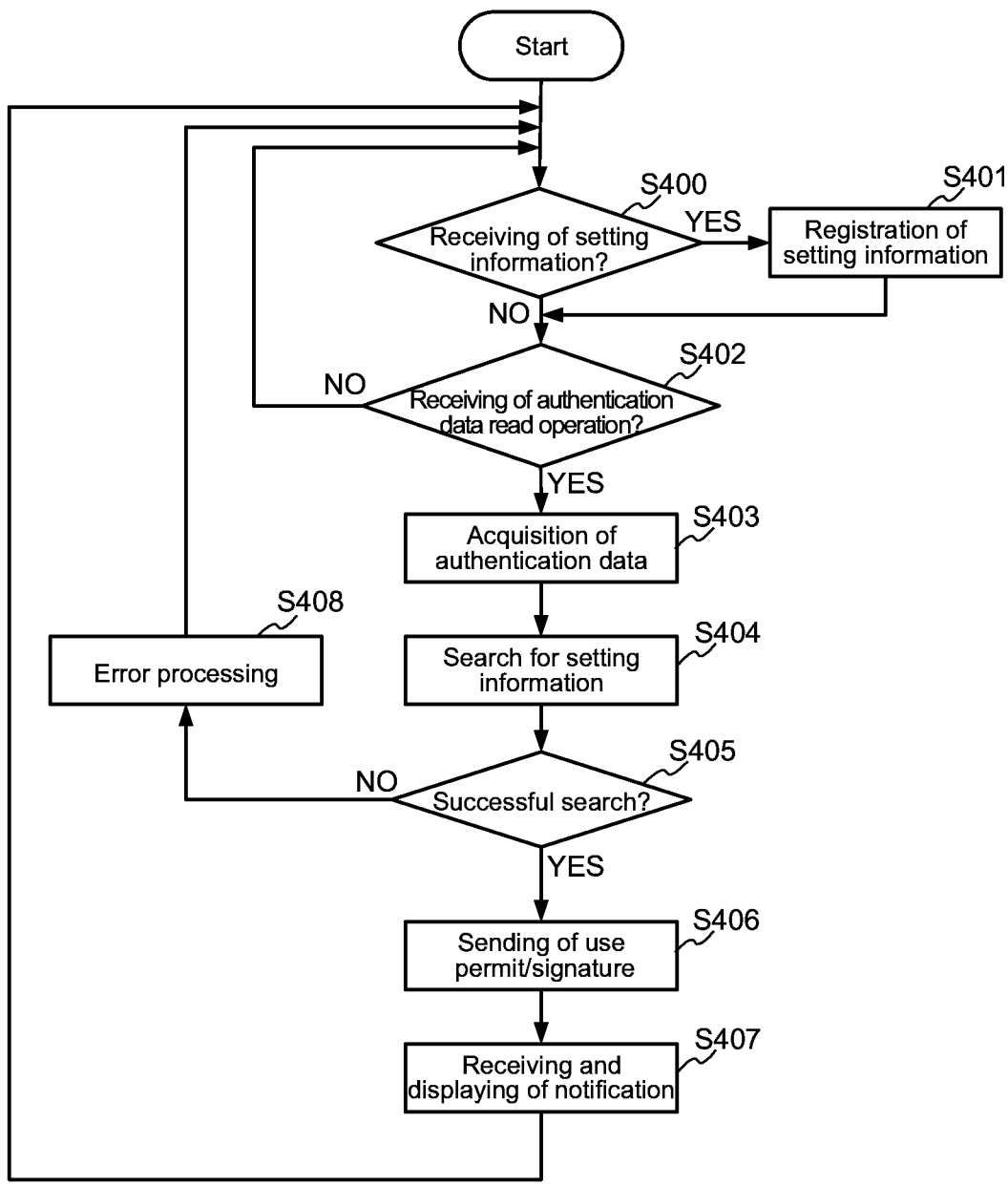
FIG. 13 is a flowchart for explaining operation of the use permit notification device 4.

FIG. 13 is a flowchart for explaining operation of the use permit notification device 4.

When the setting information receiving part 44 receives setting information from the setting terminal 5 via the Near Field Communication part 40 (YES in S400), the setting information receiving part 44 stores the setting information in the setting information storage part 43 (S401). In detail, in the case where the authentication data included in the setting information received from the setting terminal 5 is not registered in the filed 431 of any record 430 registered in the setting information storage part 43, the setting information receiving part 44 adds a new record 430 of setting information to the setting information storage part 43 to register the authentication data, the use permit, and the signature included in the setting information received from the setting terminal 5 to the fields 431-433 of the new record 430, respectively. On the other hand, in the case where the authentication data included in the setting information received from the setting terminal 5 is registered in the field 431 of a record 430 of setting information registered in the setting information storage part 43, the fields 432 and 433 of this record 430 are updated to the use permit and the signature included in the setting information received from the setting terminal 5.

Further, when the authentication data acquisition part 41 receives an authentication data read operation from a user (YES in S402), the authentication data acquisition part 41 acquires authentication data from the user according to the predetermined authentication method such as face authentication, vein authentication, or password authentication (S403). The authentication data acquisition part 41 delivers the acquired authentication data to the setting information searching part 45. Receiving the authentication data, the information searching part 45 searches the setting information storage part 43 for a record 430 of setting information by using the acquired authentication data as the key (S404).

Here, in the case where no record 430 of setting information that includes the authentication data received from the authentication data acquisition part 41 is stored in the setting information storage part 43, and thus the searching ends in failure (NO in S405), the setting information searching part 45 performs error processing such as displaying an error message on the display part 42 (S408).

On the other hand, in the case where a record 430 of setting information including the authentication data received from the authentication data acquisition part 41 is stored in the setting information storage part 43 and thus the searching ends in success (YES in S405), the setting information searching part 45 delivers the user permit and the signature included in the retrieved record 430 of setting information to the use permit sending part 46. Receiving these, the use permit sending part 46 sends the use permit and the signature received from the setting information searching part 45 to the utilization control device 3 via the Near Field Communication part 40 (S406). Thereafter, the notification receiving part 47 receives a notification (a use restriction lift notification or an error notification) from the utilization control device 3 via the Near Field Communication part 40 to display the notification on the display part 42 (S407).

Hereinabove, one embodiment of the present invention has been described.

In the present embodiment, the use permit issuing device 1 stores, for each user, authentication data together with the authentication method of the authentication data in association with at least one type of identification information. When a use permit issue request is received from the setting terminal 5, the use permit issuing device 1 issues a use permit to generate a signature on the use permit. And the use permit issuing device 1 identifies authentication data of the authentication method included in the use permit issue request among the authentication data associated with the user's identification information included in the use permit issue request to notify the setting terminal 5 of setting information that includes the use permit, the signature, and the identified authentication data. Then, the setting terminal 5 registers the setting information received from the use permit issuing device 1 in the use permit notification device 4. Therefore, even in the case where a user is going to use a usage target object for the first time, the user does not need to register his own authentication data again at the service provider who provides the service for using the usage target object, if the authentication data of the authentication method employed by the use permit notification device 4 of the utilization control unit 2 corresponding to the usage target object has been already registered in the use permit issuing device 1.

Further, by registering a use permit of a user in advance in the use permit notification device 4 in association with authentication data of the user, the user can use the usage target object under the use conditions included in the use permit by making the use permit notification device 4 read his authentication data. Accordingly, for example in the case where a group of users use a usage target object, each user of the group can freely use the facility or the like under the conditions included his own use permit. It is not needed to determine a representative among the group to entrust the representative with management of a room key or the like and locking and unlocking of the facility.

Further, in the present embodiment, the utilization control device 3 lifts restriction on use of a usage target object only if use conditions included in a use permit are satisfied, and does not lift the restriction on use of the usage target object if the use conditions are not satisfied. Accordingly, by making a use permit include use conditions such as an expiration date, the number of times of use, or the like, it is not needed to make a user return or erase a use permit since the use permit becomes ineffective in a situation in which the use conditions are not satisfied even if the use permit itself is verified to be valid.

Thus, according to the present embodiment, convenience is improved.

Further, in the present embodiment, the utilization control device 3 can communicate only via the Near Field Communication 63, being separated from any network. Accordingly, the utilization control device 3 is not attacked from the outside via the network such as the Internet. Further, a use permit used for lifting restriction on use of a usage target object is validated by verifying the signature added to the use permit by using the public key included in the hole data. Thus, according to the present embodiment, the security risk is decreased.

Thus, according to the present embodiment, it is possible to reduce the security risk while improving the convenience in use control technique for controlling use of an object whose use can be restricted by locking and unlocking, access control, or encrypting and decrypting.

The present invention is not limited to the above embodiment, and can be variously modified within the scope of the invention.

For example, in the above embodiment, the use permit issuing device 1 encrypts use conditions included in a use permit by using the common key included in the hole data set in the utilization control device 3 (encrypted use conditions), and the utilization control device 3 decrypts the encrypted use conditions included in a use permit received from the use permit notification device 4. The present invention, however, is not limited to this. It is possible that the use permit issuing device 1 does not encrypt use conditions to include use conditions as plain text in a use permit. In this case, the common key may be omitted from the hole data set in the utilization control device 3.

Further, in the above embodiment, it is satisfactory if use conditions are conditions for lifting restriction on use of a usage target object. For example, as use conditions, the number of times of use may be employed instead of or in addition to start and end dates for use. In this case, in the utilization control device 3, the use restriction lifting part 32 stores, for each user, the number of times of use of the usage target object in association with the identification information of the user. And, in S303 of FIG. 10, the use restriction lifting part 32 determines that the use conditions are satisfied if the number of times of use included as the use conditions in the use permit received from the use permit notification device 4 is less than the number of times of use stored in association with the user's identification information. Further, when the restriction on use of the usage target object is lifted in S304 of FIG. 10, the number of times of use stored in association with the user's identification information included in the use permit is incremented by one.

Further, in the above embodiment, the setting terminal 5 makes a use permit issue request to be sent to the use permit issuing device 1 include the authentication method together with user information of the user. Here, the authentication method is the method employed by the use permit notification device 4 of the utilization control unit 2 corresponding to the usage target object, and the user is grasped as the sender of the use permission request by the service provider. The present invention, however, is not limited to this. It is satisfactory for the use permit issuing device 1 that a use permit issue request includes, together with the user's identification information, specifying information that can identify the authentication method.

For example, a use permit issue request may include, as the authentication identification information, the type/intended-use of the user's identification information associated with the user's authentication data of the authentication method employed by the use permit notification device 4 of the utilization control unit 2 corresponding to the usage target object, together with the identification information of the user grasped by the service provider as the sender of the use permission request.

In this case, the authentication data storage part 103 of the storage part 101 of the use permit issuing device 1 stores the account information table 1033 shown in FIG. 14 instead of the identification information table 1030 shown in FIG. 5 and the authentication data table 1031 shown in FIG. 6.

The account information table 1033 is provided for each user in association with the root ID 1032 given to that user. The account information table 1033 stores a record 10331 of user's account information. Each record 10331 of user's account information has a field 10332 for registering a type/intended-use of identification information, such as a mail address, a mobile phone number, an employee number, a membership number, or the like, a field 10333 for registering user's identification information of this type/intended-use, a field 10334 for registering an authentication method such as face authentication, vein authentication, password authentication, or the like, and a field 10335 for registering user's authentication data of this authentication method.

Further, in S104 and S105 of FIG. 2, when the setting terminal 5 receives, from the service provider, a use permit issue operation with the object ID as the identification information of the usage target object designated in the use permission request, the identification information of the user who requested the use permission request grasped by the service provider, the type/intended-use of the user's identification information associated with the user's authentication data of the authentication method employed by the use permit notification device 4 corresponding to the usage target object, and the use conditions designated in the use permission request, then the setting terminal 5 generates a use permit issue request with designation of these pieces of information to send the generated use permit issue request to the use permit issuing device 1.

Further, in S108 of FIG. 2, the use permit issuing device 1 identifies, in the authentication data storage part 103, account information tables 1033 having a record 10331 of account information whose field 10333 registers the user's identification information designated in the use permit issue request. Then, among the identified account information tables 1033, the use permit issuing device 1 further identifies a record 10331 of account information whose field 10332 registers the type/intended-use designated in the use permit issue request. Then, the use permit issuing device 1 identifies the authentication data registered in the field 10335 of the authentication method registered in the field 10334 of this record 10331, as the user's authentication data of the authentication method employed by the use permit notification device 4 of the utilization control unit 2 corresponding to the usage target object identified by the object ID designated in the use permit issue request.

REFERENCE SIGNS LIST

1: use permit issuing device; 2,2-1-2-n: utilization control unit; 3: utilization control device; 4: use permit notification device; 5: setting terminal; 30: Near Field Communication part; 31: hole data storage part; 32: use restriction lifting part; 33: signature verification part; 34: decryption part; 40: Near Field Communication part; 41: authentication data acquisition part; 42: display part; 43: setting information storage part; 44: setting information receiving part; 45: setting information searching part; 46: use permit sending part; 47: notification receiving part; 60: WAN; 61: relay device; 62: wireless network; 63: Near Field Communication; 100: WAN interface part; 101: storage part; 102: login information storage part; 103: authentication data storage part; 104: key information storage part; 105: login processing part; 106: use permit issuing part; 107: encryption part; 108: signature generation part; 109: authentication data identification part 109; and 110: setting information sending part.

The invention claimed is:

1. A utilization control system for controlling use of usage target objects, comprising:
   a use permit issuing device that issues a use permit including use conditions for using one of the usage target objects;
   a utilization control device and a use permit notification device that are provided for each of the usage target objects, wherein the utilization control device controls use of the usage target object based on the use permit by locking/unlocking, by access control, or by encrypting/decrypting and the use permit notification device notifies the use permit to the utilization control device; and
   a setting terminal that sends a use permit issue request including designation of the usage target object to the use permit issuing device according to an instruction of an operator to acquire setting information including the use permit from the use permit issuing device, and notifies the acquired setting information to the use permit notification device that is provided correspondingly to the usage target object designated in the use permit issue request;
wherein,
   the use permit issuing device comprises:
      an authentication data storage means that stores, for each user, at least one type of authentication data together with an authentication method of the authentication data in question in association with at least one type of identification information;
      a key information storage means that stores, for each of the usage target objects, key information including a secret key used for signing the use permit;
      a use permit issuing means that, on receiving from the setting terminal a use permit issue request including user's identification information, designation of a usage target object, specifying information that can identify an authentication method employed by the use permit notification device corresponding to the usage target object, and use conditions for using the usage target object, issues the use permit that includes the use conditions included in the use permit issue request;
      a signature generation means that generates a signature on the use permit issued by the use permit issuing means, by using the secret key included in the key information stored in the key information storage means in association with the usage target object designated in the use permit issue request;
      an authentication data identification means that identifies the authentication data of the authentication method identified by the specifying information included in the use permit issue request, among the authentication data stored in the authentication data storage means in association with the user's identification information included in the use permit issue request; and
      a setting information sending means that sends setting information including the use permit issued by the use permit issuing means, the signature generated by the signature generation means, and the authentication data identified by the authentication data identification means, to the setting terminal that is the sender of the use permit issue request;
   the use permit notification device comprises:
      a setting information storage means that stores the setting information notified from the setting terminal;
      an authentication data acquisition means that acquires the authentication data from a user according to a predetermined authentication method;
      a setting information searching means that searches the setting information storage means for the setting information including the authentication data acquired by the authentication data acquisition means; and
      a use permit sending means that sends the use permit and the signature included in the setting information retrieved by the setting information searching means to the utilization control device that is the pair to the use permit notification device itself via Near Field Communication; and the utilization control device can communicate only via the Near Field Communication and comprises:
- a hole data storage means that stores hole data including a public key used for verification of the use permit;
- a use conditions acquisition means that verifies the signature received together with the use permit from the use permit notification device by using the public key included in the hole data stored in the hole data storage means, and acquires the use conditions included in the use permit when the verification being established; and
- a lifting means that lifts restriction on use of the usage target object when the use conditions acquired by the use conditions acquisition means being satisfied.

2. A utilization control system according to claim 1, wherein:
the specifying information is a method of authenticating authentication data;
the authentication data identification means identifies authentication data of the authentication method included in the use permit issue request, among the authentication data stored in the authentication data storage means in association with the user's identification information included in the use permit issue request.

3. A utilization control system according to claim 2, wherein:
the authentication data storage means stores, for each user, at least one pair of the authentication data and the authentication method associated with each other, and at least one piece of identification information, in association with a root ID associated with the user in question.

4. A utilization control system according to claim 1, wherein:
the authentication data storage means stores, for each user, at least one piece of account information including authentication data and an authentication method of the authentication data, and identification information and a type/intended-use of the identification information;
the specifying information is a type/intended-use of identification information; and
the authentication data identification means identifies account information including the type/intended-use included in the use permit issue request among the account information stored in association with the user identified by the user's identification information included in the use permit issue request in the authentication data storage means to identify authentication data included in the identified account information.

5. A utilization control system according to claim 4, wherein:
the authentication data storage means stores, for each user, at least one pair of the authentication data and the authentication method associated with each other, and at least one piece of identification information, in association with a root ID associated with the user in question.

6. A utilization control system according to claim 1, wherein:
the authentication data storage means stores, for each user, at least one pair of the authentication data and the authentication method associated with each other, and at least one piece of identification information, in association with a root ID associated with the user in question.

7. A use permit issuing device for issuing use permits including use conditions for using respective usage target objects, comprising:
- an authentication data storage means that stores, for each user, multiple types of authentication data together with authentication methods of the authentication data in question, in association with at least one type of identification information;
- a key information storage means that stores, for each of the usage target objects, key information including a secret key used for signing the use permit concerned;
- a use permit issuing means that, on receiving a use permit issue request including user's identification information, designation of a usage target object, specifying information that can identify an authentication method employed by a use permit notification device corresponding to the usage target object, and use conditions for using the usage target object, issues a use permit including the use conditions included in the use permit issue request;
- a signature generation means that generates a signature on the use permit issued by the use permit issuing means, by using the secret key included in the key information stored in the key information storage means in association with the usage target object designated in the use permit issue request;
- an authentication data identification means that identifies the authentication data of the authentication method identified by the specifying information included in the use permit issue request, among the authentication data stored in the authentication data storage means in association with the user's identification information included in the use permit issue request; and
- a setting information sending means that sends setting information including the use permit issued by the use permit issuing means, the signature generated by the signature generation means, and the authentication data identified by the authentication data identification means to a sender of the use permit issue request.

8. A utilization control method for controlling use of usage target objects by using a use permit issuing device that issues a use permit including use conditions for using one of the usage target objects, a utilization control device and a use permit notification device that are provided for each of the usage target objects, the utilization control device controlling use of the usage target object based on the use permit by locking/unlocking, by access control, or by encrypting/decrypting, and the use permit notification device that notifies the use permit to the utilization control device; and a setting terminal that notifies the use permit to the use permit notification device, wherein:
the use permit issuing device:
stores, for each user, at least one type of authentication data together with an authentication method of the authentication data in question in association with at least one type of identification information, and stores, for each of the usage target objects, key information including a secret key used for signing the use permit;
on receiving from the setting terminal a use permit issue request including user's identification information, designation of a usage target object, specifying information that can identify an authentication method employed by the use permit notification device corresponding to use conditions for using the usage target object, issues the use permit including the use conditions included in the use permit issue request;

generates a signature on the issued use permit, by using the secret key included in the key information stored in association with the usage target object included in the use permit issue request; and identifies the authentication data of the authentication method identified by the specifying information included in the use permit issue request, among the authentication data stored in association with the user's identification information included in the use permit issue request to send setting information including the issued use permit, the generated signature, and the identified authentication data to the setting terminal that is the sender of the use permit issue request;

the setting terminal:

acquires the setting information from the use permit issuing device by sending the use permit issue request to the use permit issuing device according to an instruction of an operator to acquire the setting information from the use permit issuing device; and notifies the acquired setting information to the use permit notification device that is provided correspondingly to the usage target object designated in the use permit issue request;

the use permit notification device:

stores the setting information notified from the setting terminal;

acquires the authentication data from a user according to a predetermined authentication method to search for the setting information that includes the authentication data; and sends the use permit and the signature included in the retrieved setting information to the utilization control device that is pair to the use permit notification device itself via Near Field Communication; and the utilization control device:

can communicate only via the Near Field Communication;

stores hole data including a public key used for verification of the use permit; and verifies the signature received together with the use permit from the use permit notification device by using the public key included in the hole data, and if the verification is established, lifts restriction on use of the usage target object when the use conditions included in the use permit being satisfied.

9. A computer program product stored on a non-transitory computer readable medium, wherein:

the computer program product comprises instructions configured to cause a computer to function as a use permit issuing device that issues a use permit including use conditions for using a usage target object;

the use permit issuing device comprises:

an authentication data storage means that stores, for each user, multiple types of authentication data together with authentication methods of the authentication data in question, in association with at least one type of identification information;

a key information storage means that stores, for each of the usage target objects, key information including a secret key used for signing the use permit concerned;

a use permit issuing means that, on receiving a use permit issue request including user's identification information, designation of a usage target object, specifying information that can identify an authentication method employed by a use permit notification device corresponding to the usage target object, and use conditions for using the usage target object, issues the use permit including the use conditions included in the use permit issue request;

a signature generation means that generates a signature on the use permit issued by the use permit issuing means, by using the secret key included in the key information stored in the key information storage means in association with the usage target object designated in the use permit issue request;

an authentication data identification means that identifies the authentication data of the authentication method identified by the specifying information included in the use permit issue request, among the authentication data stored in the authentication data storage means in association with the user's identification information included in the use permit issue request; and a setting information sending means that sends setting information including the use permit issued by the use permit issuing means, the signature generated by the signature generation means, and the authentication data identified by the authentication data identification means to a sender of the use permit issue request.

\* \* \* \* \*